United States Patent
Wu et al.

(10) Patent No.: US 12,115,967 B2
(45) Date of Patent: Oct. 15, 2024

(54) POWER CONTROL DEVICE AND POWER CONTROL METHOD

(71) Applicant: INDUSTRIAL TECHNOLOGY RESEARCH INSTITUTE, Hsinchu (TW)

(72) Inventors: Chih-Chiang Wu, Zhudong Township (TW); Uma Sankar Rout, Balasore (IN); Bang-Yuan Liu, Taoyuan (TW); Yun-Huan Li, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 479 days.

(21) Appl. No.: 17/562,184

(22) Filed: Dec. 27, 2021

(65) Prior Publication Data

US 2023/0202452 A1 Jun. 29, 2023

(51) Int. Cl.
*B60W 20/10* (2016.01)
*G06F 1/3296* (2019.01)

(52) U.S. Cl.
CPC ........... *B60W 20/10* (2013.01); *G06F 1/3296* (2013.01)

(58) Field of Classification Search
CPC .............................. B60W 20/10; G06F 1/3296
See application file for complete search history.

(56) References Cited

U.S. PATENT DOCUMENTS

| | | | |
|---|---|---|---|
| 8,436,590 B2 | 5/2013 | Funaba et al. | |
| 8,848,408 B2 | 9/2014 | Shindo et al. | |
| 10,035,422 B2 | 7/2018 | Zhou et al. | |
| 11,063,519 B2 | 7/2021 | Sanders | |
| 2012/0098470 A1 | 4/2012 | Itou | |
| 2014/0095005 A1 | 4/2014 | Kanzaki et al. | |
| 2014/0286060 A1 | 9/2014 | Sugiura | |

(Continued)

FOREIGN PATENT DOCUMENTS

| | | |
|---|---|---|
| CN | 105896995 A | 8/2016 |
| CN | 198738898 A | 11/2018 |

(Continued)

OTHER PUBLICATIONS

"KOA Introduces High Power Ceramic Cased Resistors for Automotive Pre-Charge/Discharge," KOA, Dec. 2, 2020, 3 pages.
Benson, "Regeneration for AC Drive Systems," Bonitron, Inc., Nashville, USA, 3 pages.
Fernandez, "DC bus pre-charging techniques," Imperix, Nov. 29, 2021, 5 pages.

(Continued)

*Primary Examiner* — Zoheb S Imtiaz
(74) *Attorney, Agent, or Firm* — Birch, Stewart, Kolasch & Birch, LLP

(57) ABSTRACT

The disclosure provides a power control device, which comprises a bleeder circuit forming a first discharging path and an aux low-voltage (LV) power supply unit forming a second discharging path. The bleeder circuit is connected with a voltage-regulating capacitor stably maintaining the high-voltage (HV) level from a HV battery. The aux LV power supply unit is connected with the bleeder circuit and the voltage-regulating capacitor in parallel. The aux LV power supply unit provides an aux LV level to the driver, when the power system operates abnormally, the HV level is discharged through the first and second discharging path and/or a third discharging path formed by a driver and a motor.

13 Claims, 5 Drawing Sheets

(56) References Cited

U.S. PATENT DOCUMENTS

| | | | |
|---|---|---|---|
| 2015/0249411 A1* | 9/2015 | Nakamura | H02P 6/186 318/400.3 |
| 2018/0198363 A1 | 7/2018 | Watanabe | |
| 2019/0379220 A1 | 12/2019 | Ueda et al. | |
| 2022/0115897 A1* | 4/2022 | Ijaz | B60L 58/12 |

FOREIGN PATENT DOCUMENTS

| | | |
|---|---|---|
| CN | 111092556 A | 5/2020 |
| JP | 6-276610 A | 9/1994 |
| TW | M284035 U | 12/2005 |
| TW | I480727 B | 4/2015 |
| TW | 201733234 A | 9/2017 |
| TW | I683199 B | 1/2020 |

OTHER PUBLICATIONS

G et al., "Active Discharge of DC Link Capacitor in SRM Drive for Electric Vehicle Application," International Journal of Engineering Applied Sciences and Technology, vol. 5, Issue 3, 2020, pp. 568-571 (4 pages total).

Kaviani et al., "A Time-Coordination Approach for Regenerative Energy Saving in Multiaxis Motor-Drive Systems," IEEE Transactions on Power Electronics, vol. 27, No. 2, Feb. 2012, pp. 931-941 (11 pages total).

Wu et al., "DC Link Capacitor Active Discharge by IGBT Weak Short Circuit," SAE International, Journal of Advances and Current Practices in Mobility, vol. 1, No. 3, 2019, 1 page.

Taiwanese Office Action and Search Report for Taiwanese Application No. 111100073, dated Aug. 9, 2022.

* cited by examiner

POWER CONTROL DEVICE AND POWER CONTROL METHOD

TECHNICAL FIELD

The present disclosure relates to a control device and a control method, and more particularly, relates to a device and a method thereof for controlling power supplies in a power system of a vehicle.

BACKGROUND

In a power system of an electrical vehicle, a high-voltage (HV) battery is disposed and configured to provide a HV level of power to the motor. In order to meet the performance requirements of the electrical vehicle, the HV level is usually set as in a range of 400V~800V. The power system operates with HV electrical energy of the above range, usually having high risks in safety. Hence, appropriate safety protection mechanism is a necessity.

The safety protection mechanism refers to dispose a bleeder circuit. When the power system operates abnormally, the bleeder circuit discharges the HV level of the HV battery. In order to meet the safety requirement with rapid discharging, the bleeder circuit of the prior art is provided with bulky and high-cost resistive elements and switching elements, resulting in an increase in the hardware cost of the power system.

Therefore, skilled ones of related industries in the technical field are devoted to improving power control device of the HV battery, so as to realize a bleeder circuit in the power control device with small volume and low-cost components. In addition, the improved power control device has a complete protection mechanism, which can flexibly execute corresponding discharging functions when the HV battery and/or the additional LV battery of the power system operate abnormally.

SUMMARY

According to one aspect of the disclosure, a power control device is provided. The power control device is for controlling a plurality of power supplies of a power system, the power supplies at least include a high-voltage (HV) battery to provide a high-voltage (HV) level, the power control device includes a bleeder circuit and an auxiliary low-voltage (aux LV) power supply unit. The bleeder circuit is connected with a voltage-regulating capacitor in parallel, the voltage-regulating capacitor is configured to stably maintain the HV level, and the bleeder circuit forms a first discharging path. The aux LV power supply unit is connected with the bleeder circuit and the voltage-regulating capacitor in parallel, and the aux LV power supply unit forms a second discharging path. The power system further includes a motor and a driver, the driver is configured to drive the motor, the driver and the motor form a third discharging path, and the aux LV power supply unit is configured to provide an auxiliary low-voltage (aux LV) level to the driver. When the power system operates abnormally, the HV level maintained by the voltage-regulating capacitor is discharged through the first, second and/or third discharging paths.

According to one aspect of the disclosure, a power control method is provided. The power control method is for controlling a plurality of power supplies, a motor and a driver of a power system and controlling a power control device, the power supplies at least include a high-voltage (HV) battery providing a high-voltage (HV) level and a low-voltage (LV) battery providing a low-voltage (LV) level, and the power control device includes a bleeder circuit and an auxiliary low-voltage (aux LV) power supply unit, wherein the bleeder circuit forms a first discharging path, the aux LV power supply unit forms a second discharging path, the driver and the motor form a third discharging path. The power control method includes the following steps. Determining whether the LV battery is activated. When the LV battery is not activated, activating the aux LV power supply unit to generate an auxiliary low-voltage (aux LV) level. Determining whether the HV battery is activated. When the HV battery is activated, determining that the power system operates abnormally and generating an error signal, and disabling the at least one power switch connected with an anode of the HV battery. Confirming that the at least one power switch is in a continuously disabled state until the power system is restarted.

Figure 1:
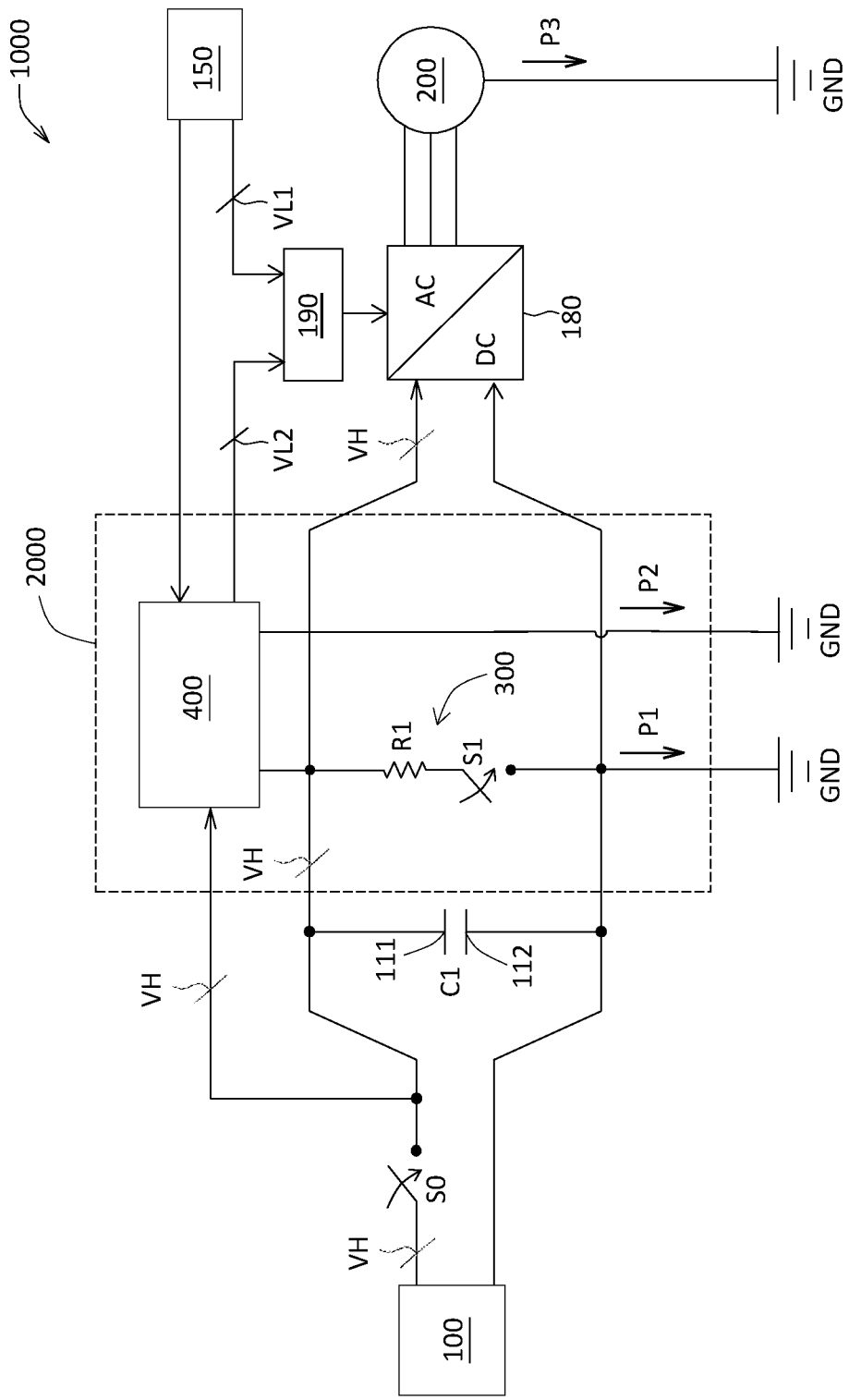
FIG. 1 is a simplified schematic diagram of a power control device which is applied to a power system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

Figure 2:
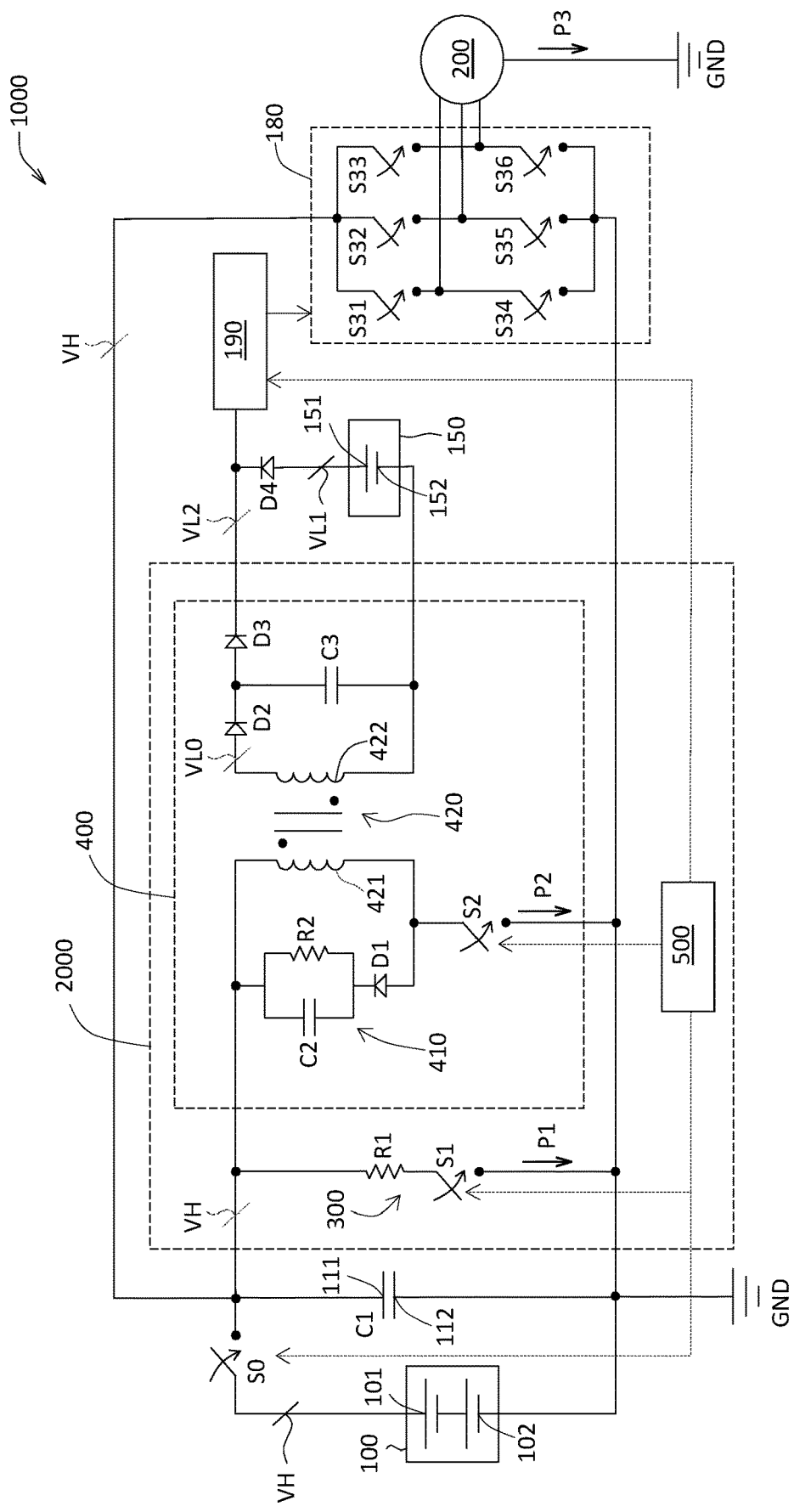
FIG. 2 is a circuit diagram of the power control device of FIG. 1 which is applied to the power system.

FIG. 1 is a simplified schematic diagram of a power control device 2000 which is applied to a power system 1000 according to an embodiment of the disclosure, and FIG. 2 is a circuit diagram of the power control device 2000 of FIG. 1 which is applied to the power system 1000. Please refer to FIGS. 1 and 2, the power system 1000 refers to, for example, a motor gearing/transmission and power system of an electric vehicle. The power system 1000 may include a high-voltage (HV) battery 100, a voltage-regulating capacitor C1, a low-voltage (LV) battery 150, a regulator 190, a driver 180 and a motor 200. In addition, the power control device 2000 of this embodiment is also disposed in the power system 1000, and the power control device 2000 is used to provide power management and power protection mechanism for the power system 1000.

The HV battery 100 can provide a DC power with a (high-voltage) HV level (named as "VH"). Taking the power system 1000 of the electrical vehicle as an example, the HV level "VH" has a range of 400V to 800V. The anode 101 of the HV battery 100 is connected with a power switch S0, and pulse input of the HV level "VH" can be controlled by the power switch S0.

The voltage-regulating capacitor C1 refers to a DC-bus capacitor, which may be named as a "DC-Link capacitor".

The voltage-regulating capacitor C1 is substantially connected with the HV battery 100 in parallel, wherein the first end 111 of the voltage-regulating capacitor C1 is connected to the anode 101 of the HV battery 100 through the power switch S0. When the power switch S0 is turned-on, i.e., when the power switch S0 is in a enable state, the DC power of the HV level "VH" can be transmitted to the first end 111 of the voltage-regulating capacitor C1. Furthermore, charges are stored at the first end 111 of the voltage-regulating capacitor C1 in response to the HV level "VH". Therefore, the voltage-regulating capacitor C1 serves to regulate and stabilize voltage level, so that the HV level "VH" may be maintained as relatively stable (even constant) voltage value.

When the power switch S0 is turned on, DC power of the HV level "VH", which is stabilized and regulated by the voltage-regulating capacitor C1, can be transmitted to the driver 180, so that the driver 180 provides a driving current to the coil disposed on the rotor inside the motor 200 (the rotor and coil are not shown in FIG. 1) so as to drive the rotor to operate (for simplicity, the DC-AC conversion for DC power of HV level "VH" to AC power is omitted herein). The driver 180 may include, for example, a plurality of switches e.g., six switches S31~S36 (switches S31~S36 are referred to as "third switches"). In one example, the physical circuitry elements of the switches S31~S36 may be implemented by transistors, and gate voltages of the corresponding transistors are adjusted to control the switches S31~S36 to be a turned-on state or a turned-off state respectively, hence the driver 180 is referred to as a "gate driver". In addition, the switches S31~S36 may have a structure of "inverter". The supply of the driving current may be adjusted by controlling the period ratio for which the switches S31~S36 are turned-on, by a pulse width modulation (PWM) mechanism, thereby rotational speed of the motor 200 may be controlled.

The low-voltage (LV) battery 150 (also referred to as "minor battery" or regarded as "weak electricity") may provide a DC power with a low-voltage (LV) level "VL1". Taking the power system 1000 of the electrical vehicle as an example, the LV level "VL1" is in a range of 10V~36V. The anode 151 of the LV battery 150 is connected with the diode D4, and the diode D4 may perform clamping on the DC power of the LV level "VL1", so as to correct voltage value of the LV level "VL1" upward or downward. The anode 151 of the LV battery 150 is connected to the regulating controller 190 through the diode D4, and DC power of the LV level "VL1" is provided to the driver 180 through regulation and filtering processing by the regulating controller 190. Compared with DC power of the HV level "VH", which is used as a main high voltage power for the driver 180 and the motor 200 so as to drive operation of the rotor inside the motor 200, DC power of the LV level "VL1" is used as a secondary low voltage power for maintaining basic operation of the driver 180. For example, DC power of the LV level "VL1" may maintain a part or all of the switches S31~S36 of the driver 180 in a turned-on state.

When an unexpected condition occurs to the body of vehicle (such as accidental collision of the vehicle, or a lightning strike) or an abnormality occurs to the HV battery 100 itself (such as leakage or short circuit of the HV battery 100), in order to prevent damage on circuitry components of the power system 1000 by HV level "VH" outputted by the HV battery 100, the HV level "VH" maintained by the voltage-regulating capacitor C1 must be rapidly discharged within a limited time. The circuitry path formed by the driver 180 and the motor 200 may serve as a discharging path for the HV level "VH". Hereinafter, the discharging path formed by the driver 180 and the motor 200 is referred to as a "third discharging path P3"). In one example, when the HV battery 100 stops providing DC power of the HV level "VH", the rotor inside the motor 200 is in a stationary state. Furthermore, the LV battery 150 continues to provide DC power of the LV level "VL1", and part or all of the switches S31~S36 of the driver 180 may be maintained as turned-on state. Accordingly, turned-on switches S31~S36 in the driver 180 and stationary rotor in the motor 200 may form a turned-on third discharging path P3.

The power control device 2000 is used to provide power management and power protection mechanism for the power system 1000, where the power control device 2000 may be disposed between the regulating capacitor and the driver 180. The power control device 2000 may generate power of the (auxiliary low-voltage) aux LV level "VL2" which is provided to the driver 180 through the regulating controller 190 to maintain basic operation of the driver 180. Such as, power of the aux LV level "VL2" may maintain a part or all of the switches S31~S36 are as turned-on state. In other words, function of the aux LV level "VL2" provided by the power control device 2000 is similar to function of the LV level "VL1" provided by the LV battery 150. That is, the driver 180 is maintained as turned-on state, so that the driver 180 and the motor 200 may form a turned-on third discharging path P3.

More particularly, the power control device 2000 includes a bleeder circuit 300, an auxiliary low-voltage (aux LV) supply unit 400 and a controller 500. The bleeder circuit 300 includes a resistor (low-resistance resistor) R1 and a switch S1 connected in series. One end of the resistor R1 is connected to the first end 111 of the voltage-regulating capacitor C1 and connected to the anode 101 of the HV battery 100 through the power switch S0. One end of the switch S1 is connected to the second end 112 of the voltage-regulating capacitor C1, the cathode 102 of the HV battery 100 and the ground end GND. Hereinafter, the switch S1 is referred to as a "first switch". When the switch S1 is turned on (i.e., the switch S1 is in an enabled state), the resistor R1 and the switch S1 may form a turned-on discharging path to discharge the HV level "VH" maintained by the voltage-regulating capacitor C1. Hereinafter, the discharging path formed by the resistor R1 of the bleeder circuit 300 and the switch S1 is referred to as a "first discharging path P1". In one example, the switch S1 refers to a relay switch, and the switch S1 thus has a smaller volume. In addition, compared with the general large-volume/large-resistance resistors, the resistor R1 has a lower impedance value (for example, 1.5k ohms). Therefore, the equivalent RC time constant of the resistor R1 and the voltage-regulating capacitor C1 is smaller, thus can achieve a higher discharging speed. Moreover, the resistor R1 has a smaller resistance value and power consumption may thus be saved. In one example, the resistor R1 refers to a surface mount technology (SMT) resistor, such a resistor R1 may have a smaller volume and lower cost.

The aux LV power supply unit 400 is disposed on one side of the bleeder circuit 300. The aux LV power supply unit 400 is connected to the voltage-regulating capacitor C1 and connected to the anode 101 of the HV battery 100 through the power switch S0, so as to receive the HV level "VH". The aux LV power supply unit 400 may decrease the HV level "VH" to an aux LV level "VL2", where the aux LV level "VL2" is in a range of 9V-20V.

The aux LV power supply unit 400 includes a surge suppression circuit 410, a switch S2, a transformer 420, diodes D2 and D3 and a capacitor C3. One end of the surge suppression circuit 410 is connected to the first end 111 of the voltage-regulating capacitor C1 and connected to the anode 101 of the HV battery 100 through the power switch S0. The other end of the surge suppression circuit 410 is connected to the second end 112 of the voltage-regulating capacitor C1, the cathode 102 of the HV battery 100 and the ground end GND, through the switch S2. The surge suppression circuit 410 includes a capacitor C2, a resistor R2 and a diode D1, wherein the capacitor C2 is connected in parallel with the resistor R2, furthermore, the capacitor C2 and the resistor R2 are connected to the diode D1 in common. The surge suppression circuit 410 is used to suppress surges that may be generated by the HV level "VH", so as to ensure the transformer 420 and circuit elements at the subsequent stage not damaged by the surges in the HV level "VH". In one example, if the HV level "VH" generates a surge, the capacitor C2 and the resistor R2 of the surge suppression circuit 410 may filter and smooth the surge, and the diode D1 of the surge suppression circuit 410 may correct and shift voltage value of the HV level "VH" downward.

Hereinafter, the switch S2 is referred to as a "second switch". When the switch S2 is turned on (i.e., S2 is in an enabled state), the surge suppression circuit 410 and the switch S2 may form a turned-on discharging path, for discharging the HV level "VH" maintained by the voltage-regulating capacitor C1. Hereinafter, a discharging path formed by the surge suppression circuit 410 and the switch S2 in the aux LV power supply unit 400, is referred to as a "second discharging path P2". In one example, the switch S2 refers to relay switch similar to the switch S1.

The transformer 420 has a first-side coil 421 (i.e., a high-voltage side coil) and a second-side coil 422 (i.e., a low-voltage side coil). The first-side coil 421 is connected to the surge suppression circuit 410 and the first end 111 of the voltage-regulating capacitor C1, and connected to the anode 101 of the HV battery 100 through the power switch S0. The first-side coil 421 may receive the HV level "VH" outputted by the HV battery 100, and perform voltage conversion (i.e., voltage decreasing) by the transformer 420 to generate a voltage level "VL0", which is lower than the HV level "VH", at the second-side coil 422. The voltage level "VL0" is clamped by the diode D2, and charges are stored in the capacitor C3 in response to the voltage level "VL0". That is, the capacitor C3 also functions to stabilize and regulate the voltage level. Then, the diode D3 may clamp to form the aux LV level "VL2". The clamping by the diodes D2 and D3 may correct and shift the voltage level of the aux LV level "VL2" upward or downward. Then, the aux LV level "VL2" is transmitted to the regulating controller 190, thereby providing power of the aux LV level "VL2" to the driver 180. In addition to converting the HV level "VH" into a lower aux LV level "VL2", the transformer 420 also serves to isolate the HV battery 100 from the driver 180 and the motor 200. In one example, the anode 151 of the LV battery 150 may be connected to the second side 422 of the transformer 420 through diode D4, diode D3 and diode D2, in sequence. The cathode 152 of the LV battery 150 may be directly connected to the second side 422 of the transformer 420.

In view of the above, the aux LV power supply unit 400 of this embodiment may achieve at least the following technical effects. The first effect refers to that, when the LV battery 150 operates abnormally and cannot provide power of the LV level "VL1" to the driver 180, the aux LV power supply unit 400 may provide power of the aux LV level "VL2" to the driver 180 so as to protect the power of the driver 180. That is, to ensure the power supplied to the driver 180. When the HV level "VH" maintained by the voltage-regulating capacitor C1 needs to be discharged, the aux LV level "VL2" may ensure circuit path inside the driver 180 being turned on, so that the HV level "VH" may be discharged through the third discharging path P3 formed by the driver 180 and the motor 200. Furthermore, the second effect refers to that, when the HV level "VH" maintained by the voltage-regulating capacitor C1 needs to be discharged, the aux LV power supply unit 400 may also provide a second discharging path P2 to discharge the HV level "VH".

According to the above-mentioned embodiments shown in FIGS. 1 and 2, when discharging the HV level "VH" maintained by the voltage-regulating capacitor C1, the power control device 2000 may provide at least the first discharging path P1 (formed by the bleeder circuit 300) and the second discharging path P2 (formed by the surge suppression circuit 410 and the switch S2). In addition, the switches S31-S36 inside the driver 180 and the coils of the rotor inside the motor 200 in existing circuit topology of the power system 1000, may also provide the third discharging path P3. The power control device 2000 further includes a controller 500 such as a central processing unit (CPU) or a microcontroller (MCU). The controller 500 may respectively control the power switch S0, the switch S1 and the switch S2 to a turned-on state or turned-off state and control the regulating controller 190, so as to select the first to third discharging paths P1-P3 to perform discharging. Moreover, the HV battery 100, the LV battery 150 and the aux LV power supply unit 400 may be activated (enabled) or de-activated (disabled) by the controller 500, so that the power system 1000 operates in different modes and the motor 200 has a corresponding operating state. Please refer to Table 1:

TABLE 1

| Power switch S0 | LV battery 150 | HV battery 100 | Aux LV power supply unit 400 | Operating mode of the power system 1000 and/or corresponding operating state of the motor 200 |
|---|---|---|---|---|
| Turned-off | De-activated | De-activated | No operation | "state-1" No power output |
| Turned-off | De-activated | Activated (DC-link path) | Activated | "state-2" Discharging mode |
| Turned-on | De-activated | Activated | Activated | "state-3" Safety protection mode |
| Turned-off | Activated | De-activated | De-activated | "state-4" Normal operation mode |
| Turned-on | Activated | Activated | De-activated | "state-5" Normal operation mode |

In an example of "state-1", the vehicle is stationary, and the motor 200 does not need to output power, hence the motor 200 does not operate. Therefore, the motor 200 needs no power, thus the HV battery 100, the LV battery 150 and the aux LV power supply unit 400 need not to operate. The controller 500 controls the power switch S0 to be turned-off state, the controller 500 de-activates the LV battery 150 and the HV battery 100, and the aux LV power supply unit 400 does not operate.

In "state-2", when the controller 500 de-activate the LV battery 150 and the HV battery 100 is activated, if the power switch S0 is turned-off, the aux LV power supply unit 400 may be activated to operate in the discharging mode. In one example, when an accidental collision or a lightning strike occurs outside the vehicle body, or an abnormality occurs in circuitry elements of the power system 1000 inside the vehicle body (for example, leakage or short-circuit of the HV battery 100 due to moisture, or disable of HV battery 100 due to expansion of high temperature), in order to prevent the HV level "VH" outputted by the HV battery 1000 from damaging circuitry elements of the power system 1000, the HV level "VH" needs to be discharged as soon as possible. Furthermore, in order to comply with safety regulations, the HV level "VH" has to be rapidly discharged to a safe range within a limited time, which refers to "active discharging". For example, it is stipulated in the relevant government regulations (such as "United Nation Vehicle Regulation ECE R94") that, HV level "VH" maintained by the voltage-regulating capacitor C1 of the HV battery 100 has to be decreased below 60 volts within five seconds. Furthermore, the vehicle manufacturers have more strict specifications, which stipulates HV level "VH" has to be decreased below 36 volts within one second.

In addition, in "state-3", when the controller 500 de-activate the LV battery 150 and the HV battery 100 is activated, if the power switch S0 is turned-on, the aux LV power supply unit 400 is activated to provide protection for power of the driver 180. At this moment, the power system 1000 operates in a "safe protection mode".

On the other hand, in "state-4" and "state-5", when the controller 500 activates the LV battery 150, no matter the HV battery 100 is activated or de-activated, the power system 1000 operates in the "normal operation mode". In the normal operation mode of "state-4" or "state-5", the vehicle drives normally, and the motor 200 continuously operates to provide kinetic energy for the vehicle to drive, in which the LV battery 150 is in an activated state to continuously provide the LV level "VL1". The LV level "VL1" is transmitted to the driver 180 through the regulating controller 190 to maintain the basic operation of the driver 180 (i.e., a part or all of the switches S31~S36 inside the driver 180 are turned-on).

However, in the normal operation modes of "state-4" and "state-5", when the LV battery 150 is in an activated state but the LV battery 150 is abnormal (for example, the LV battery 150 has a leakage, a short circuit caused by moisture or high temperature expansion), it may be necessary to discharge the LV level "VL1" outputted by the LV battery 150. Since the LV level "VL1" has a lower voltage value, risk causing danger is less (less risk of damaging circuitry components of the power system 1000). Hence, the discharging may be performed at a slower speed, which refers to "passive discharging". When the LV level "VL1" outputted by the LV battery 150 needs to be passively discharged at a slower speed, such discharging may be performed through the resistor R1 and the switch S1 on the first discharging path P1. In an example, if only considering passive discharging of the LV level "VL1" of the LV battery 150 which needs lower discharging speed, the resistor R1 may have a larger resistance (e.g., 5k ohms). Hence, the equivalent RC time constant for the resistor R1 and voltage-regulating capacitor C1 has a larger value.

In view of the above, when performing rapid "active discharging" for the HV level "VH" outputted by the HV battery 100, one, two or three of the first to third discharging paths P1~P3 may be employed to discharge. On the other hand, when performing slow "passive discharging" for the LV level "VL1" outputted by the LV battery 150, the first discharging path P1 may be employed to discharge. The controller 500 may control the switch S1 to turn on the first discharging path P1, control the switch S2 to turn on the second discharging path P2, and control the regulating controller 190 and switches S31~S36 to turn on the third discharging path P3. In addition, the controller 500 may control all power switches in the power system 1000, including the power switch S0 connected to the anode 101 of the HV battery 100 shown in FIGS. 1 and 2 and other power switches not shown.

Figure 3:
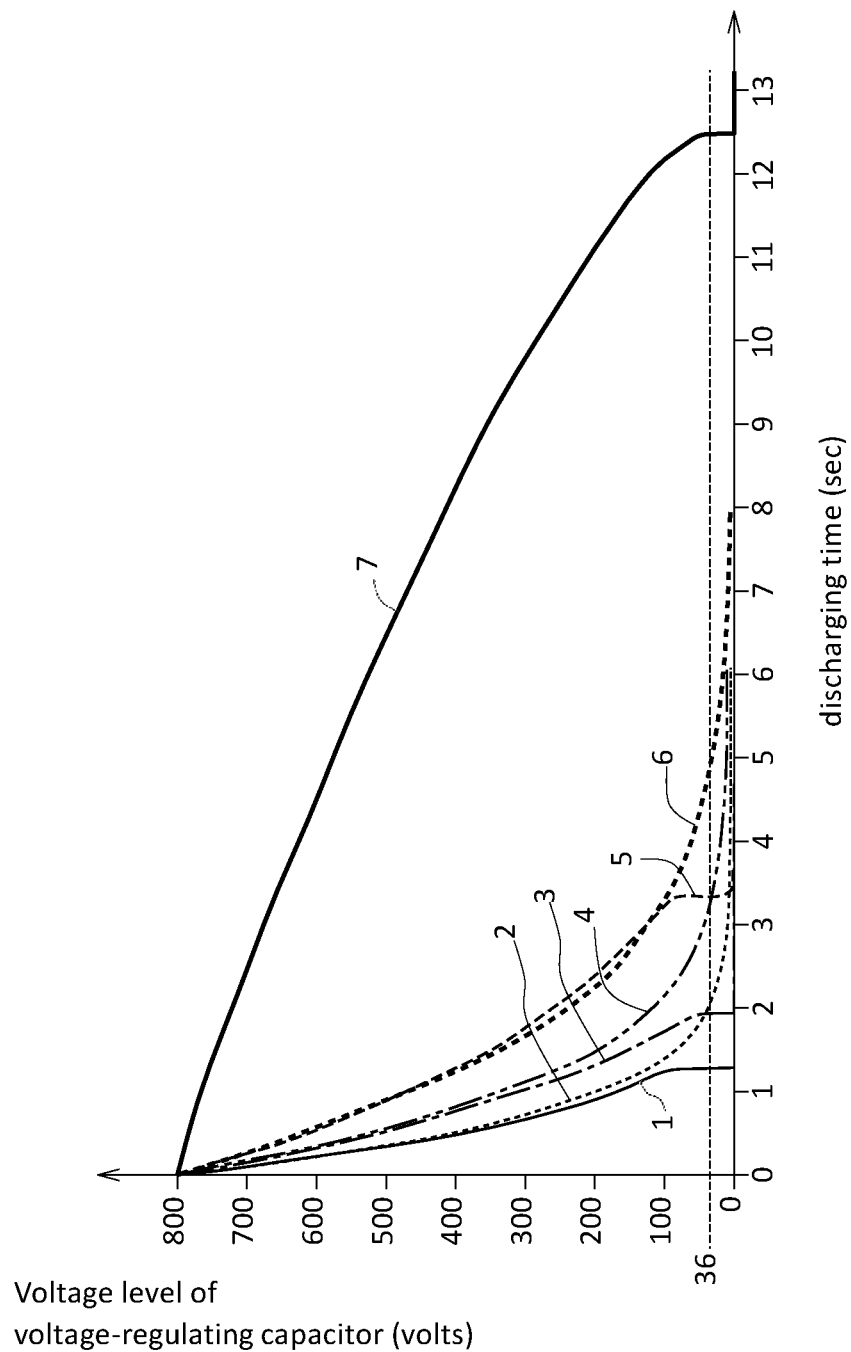
FIG. 3 is a diagram illustrating the relationship between the voltage level of the voltage-regulating capacitor and the discharging time in different combinations for the first to third discharging paths in various examples of the disclosure.

FIG. 3 is a diagram illustrating the relationship between the voltage level of the voltage-regulating capacitor C1 and the discharging time for different combinations of the first to third discharging paths P1~P3 in various examples of the disclosure. The horizontal axis refers to discharging time (unit is "second"), and the vertical axis refers to voltage level of the regulating capacitor C (unit is "volt"). Referring to FIG. 3, in the first example (the curve marked with "1"), the controller 500 turns on the switch S1, the switch S2 and part or all of the switches S31~S36, so that the HV level "VH" of the voltage-regulating capacitor C1 may be discharged through all three of the first discharging path P1 (i.e., the bleeder circuit 300), the second discharging path P2 (i.e., the path of partial circuitry of the aux LV power supply unit 400) and the third discharging path P3 (i.e., the driver 180 and the motor 200). Hence, it has the fastest discharging speed. The HV level "VH" of the voltage-regulating capacitor C1 may decrease from 800 volts to 36 volts in about 1.2 seconds.

In the second example (the curve marked with "2"), the controller 500 turns on the switch S1 and parts or all of the switches S31~S36, so that the HV level "VH" of the voltage-regulating capacitor C1 may be discharged through both the first discharging path P1 and the third discharging path P3. The HV level "VH" of the voltage-regulating capacitor C1 may decrease from 800 volts to 36 volts in about 2 seconds.

In the third example (the curve marked with "3"), the controller 500 controls the switch S2 to be turned-on state, so that the HV level "VH" of the voltage-regulating capacitor C1 may be discharged through the second discharging path P2. At the same time, the controller 500 controls parts or all of the switches S31~S36 to be turned-on state. That is, the switches on the same path are turned-on at the same time. For example, the switches S31 and S34 on the same path are turned-on at the same time, or turning-on the switches S32 and S35 at the same time, or turning-on the switches S33 and S36 at the same time. Therefore, the HV level "VH" of the voltage-regulating capacitor C1 may be discharged through the third discharging path P3. In this manner, the HV level "VH" of the voltage-regulating capacitor C1 may also decrease from 800 volts to 36 volts in about 2 seconds.

In the fourth example (the curve marked with "4"), the controller 500 turns on parts or all of the switches S31~S36, so that the HV level "VH" of the voltage-regulating capacitor C1 is discharged only through the third discharging path P3. In this manner, the HV level "VH" of the voltage-regulating capacitor C1 may decrease from 800 volts to 36 volts in about 3.2 seconds.

In the fifth example (the curve marked with "5"), the HV level "VH" of the voltage-regulating capacitor C1 is discharged through the first discharging path P1 and the second discharging path P2, and the HV level "VH" of the voltage-regulating capacitor C1 may decrease from 800 volts to 36 volts in about 3.2 seconds.

In the sixth example (the curve marked "6"), the HV level "VH" of the voltage-regulating capacitor C1 is discharged through the first discharging path P1, and the HV level "VH" of the voltage-regulating capacitor C1 may decrease from 800 volts to 36 volts in about 4.8 seconds.

In the seventh example (the curve marked with "7"), the HV level "VH" of the voltage-regulating capacitor C1 is discharged through the second discharging path P2 with a slower discharging speed. In this manner, the HV level "VH" of the voltage-regulating capacitor C1 may decrease from 800 volts to 36 volts in about 12.3 seconds.

Figure 4A:
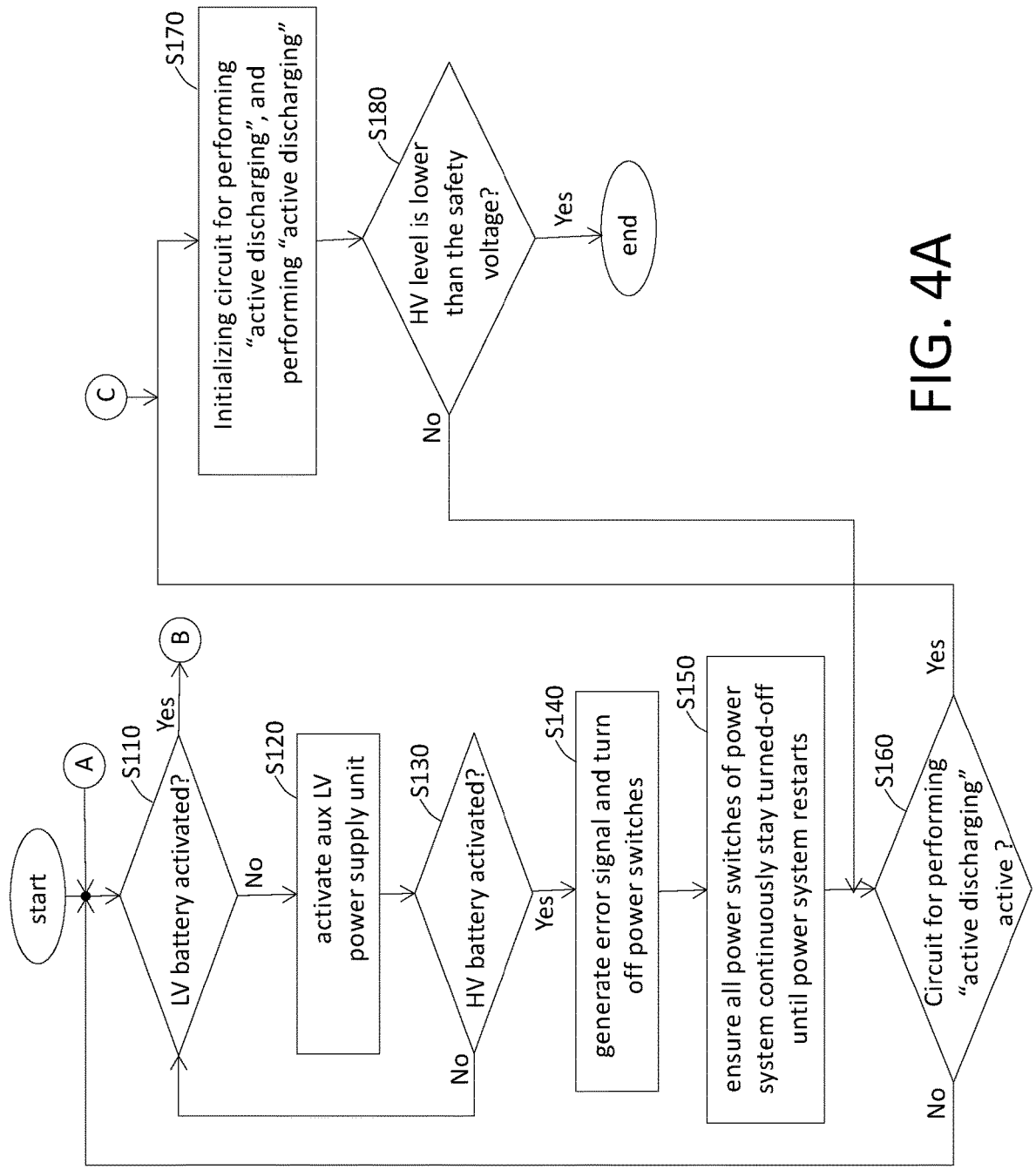
FIGS. 4A and 4B are flowcharts of a power control method according to an embodiment of the disclosure.
Figure 4B:
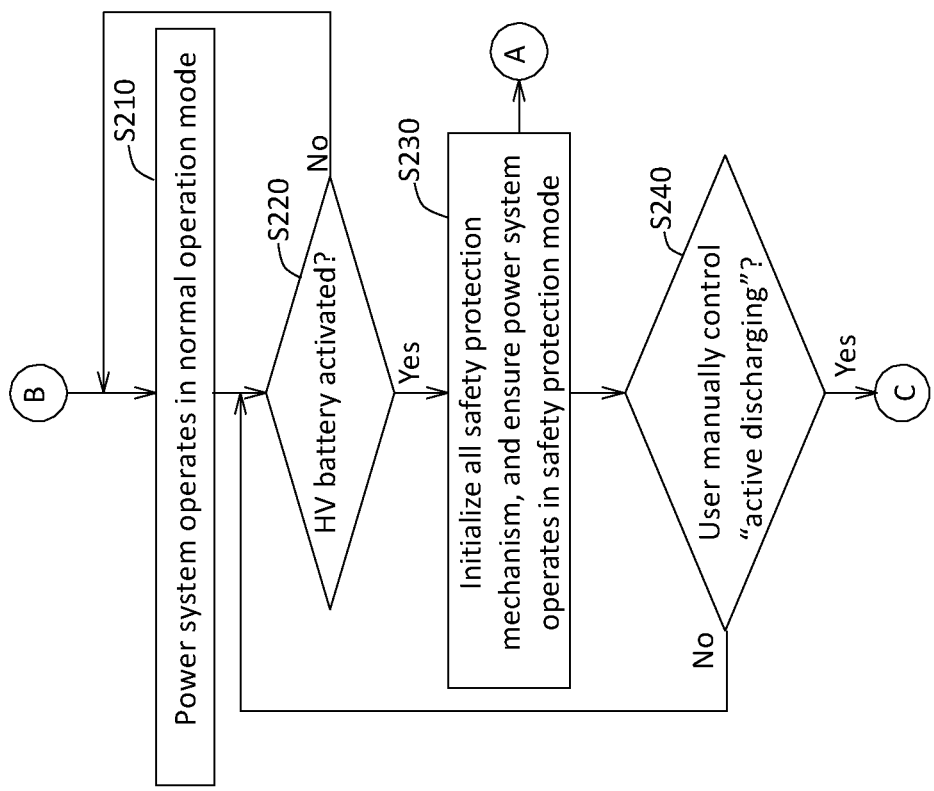

FIGS. 4A and 4B are flowcharts of a power control method in an embodiment of the disclosure. The power control method in this embodiment may be carried out based on the power control device 2000 shown in FIGS. 1 and 2 and based on operating state of the motor 200 and operating mode of the power system 1000 shown in Table 1. Referring to FIG. 4A, first, in step S110, it is determined whether the LV battery 150 of the power system 1000 is in an activated (enabled) state. In one example of determining the LV battery 150 as the activated state, when the power system 1000 operates in the normal operation mode of "state-4" or "state-5" in Table 1, the vehicle normally drives, and the motor 200 continues operating to provide kinetic energy required for the vehicle. Meanwhile, the LV battery 150 is in an activated state so as to continuously provide the LV level "VL1" to the driver 180.

However, in step S110, if determining that the LV battery 150 is not activated (i.e., in a de-activated state) and cannot provide the LV level "VL1" to the driver 180, then step S120 is executed to activate the aux LV power supply unit 400. Hence, the aux LV power supply unit 400 may provide the aux LV level "VL2" to the driver 180. In one example of determining the LV battery 150 as a de-activated state, when the power system 1000 operates in the discharging mode of "state-2" or the safety protection mode of "state-3" in Table 1, the LV battery 150 refers to a turned-off state (i.e., a de-activated state) and cannot provide the LV level "VL1" to the driver 180.

In step S120, the aux LV power supply unit 400 is activated, so that the aux LV power supply unit 400 may assist or support the LV battery 150 to provide the aux LV level "VL2" to the driver 180. In this embodiment, according to voltage conversion processing by the transformer 420 in the aux LV power supply unit 400 in FIG. 2, the HV level "VH" outputted by the HV battery 100 is decreased to the aux LV level "VL2" with a lower voltage value. In other words, in step S120, since the LV battery 150 cannot provide the LV level "VL1", instead, the aux LV level "VL2" is used to assist or support the LV level "VL1". Therefore, even if the LV battery 150 is not activated, the aux LV level "VL2" may be obtained by the aux LV power supply unit 400 (converted from the HV level "VH" provided by the HV battery 100), and the aux LV level "VL2" is provided to the driver 180.

In addition, in the step 120, before activating the aux LV power unit 400 and performing voltage conversion by the transformer 420, surge suppression is performed to the HV level "VH" by the surge suppression circuit 410, so as to ensure the transformer 420 and circuitry elements of later stages being free from damage by the surge of HV level "VH".

Next, step S130 is executed to determine whether the HV battery 100 is in an activated (enabled) state. In step S130, if determining the HV battery 100 as the de-activated state, step S110 is re-executed to determine whether the LV battery 150 is activated. In one example of determining the HV battery 100 as the de-activated state in step S130, when the power system 1000 operates in the state of "No power output" in Table 1 (i.e., the motor 200 does not output power), the vehicle is stationary and the motor 200 does not operate. At this time, the HV battery 100 needs not to be activated. Alternatively, when the power system 1000 operates in the normal operation mode of "state-4", when collision occurs to the vehicle or the HV battery 100 itself has leakage or short circuit, the HV battery 100 is forced to be turned-off for safety considerations. In the above two examples, the HV battery 100 is not activated (i.e., in a de-activated state).

On the other hand, in step S130, if determining the HV battery 100 as the activated state, step S140 is executed to generate an error signal, and the power switch S0 is turned-off (i.e., disabled). In one example of determining the HV battery 100 as the activated state in step S130, when the power system 1000 operates in the safety protection mode of "state-3" or the normal operation mode of "state-5" in Table 1, the vehicle normally drives, and the motor 200 keeps providing kinetic energy required for the vehicle. At this time, the HV battery 100 is in an activated state to continuously provide the HV level "VH". The HV level "VH" is converted into a driving current through the driver, and the driving current is used to drive the motor 200.

Next, step S150 is executed to confirm that, all power switches in the power system 1000 (including the power switch S0 and other power switches not shown in FIGS. 1 and 2) continuously stay/hold in the turned-off state until the power system 1000 re-starts.

Next, step S160 is executed to determine whether the circuit for executing "active discharging" is activated. The "active discharging" may be performed through one, two or all three of the first to third discharging paths P1~P3. Therefore, by checking corresponding switches S1, S2 and S31~S36 on the first to third discharging paths P1~P3 as turned-on or turned-off, it is determined whether the circuit for executing "active discharging" is activated.

If determining that the circuit for executing "active discharging" is not activated, step S110 is executed again. If determining the circuit for executing "active discharging" as activated in step S160, then, step S170 is executed to initialize the circuit for performing "active discharging" or the software of the controller 500. In one example of initialization of the circuit or software, circuit for performing "active discharging" may include any one of the first to third discharging paths P1 to P3. Before discharging through the first to third discharging paths P1 to P3, software program of the controller 500 needs to be initialized, so that the controller 500 may control the switches S1, S2 and S31~S36 on the first to third discharging paths P1~P3 as a turned-on state, through the software program. After the circuit for performing the "active discharging" or software of controller 500 has been initialized, "active discharging" is performed through one, two or all of the first to third discharging paths P1~P3, so as to discharge the HV level "VH" of the voltage-regulating capacitor C1. At this time, the power system 1000 operates in the discharging mode of "state-2" in Table 1.

Next, step S180 is executed to determine whether the HV level "VH" has been discharged to a voltage level lower than a safety voltage (e.g., the safety voltage refers to 36 volts) as required. If the HV level "VH" is lower than the safety voltage, the power control method of this embodiment is completed. If the HV level "VH" is still higher than the safety voltage, step S160 is executed again to determine whether the circuit performing the "active discharging" is activated.

Then, please refer to FIG. 4B. If in step S110 of FIG. 4A it's determined that LV battery 150 has been activated, step S210 of FIG. 4B is executed to make the power system 1000 operate in the normal operation mode of "state-4" or "state-5" in Table 1.

Next, in step S220, it is determined whether the HV battery 100 is activated. If determining the HV battery 100 as not activated (as "state-4" in Table 1), step S210 is executed again. On the other hand, if determining the HV battery 100 as activated (as "state-5" in Table 1), step S230 is executed.

In step S230, all safety protection mechanisms in the power system 1000 are initialized, and the power system 1000 is ensured to operate in a "safety protection mode". Furthermore, after step S230, step S110 of FIG. 4A may be executed again, and step S240 is executed subsequently.

In step S240, it is determined whether the user needs to manually execute "active discharging". If the user needs to intervene to manually execute the "active discharging", step S170 in FIG. 4A is executed to initialize the circuit performing "active discharging". In one example of the initialization, the user may command the controller 500 to turn on the switches S1, S2 and S1-S36 on the first to third discharging paths P1~P3.

On the contrary, in step S240 if determining the user needs not to manually execute "active discharging", step S220 is re-executed to determine whether the HV battery 100 is activated.

From the above-mentioned examples, the power control device 2000 of the power system 1000 of this disclosure disposes the bleeder circuit 300 as the first discharging path P1 and disposes the aux LV power supply unit 400 as the second discharging path P2. Furthermore, the third discharging path P3 is formed by the driver 180 and the coil of rotors inside the motor 200 in existing circuitry topology of the power system 1000. When accidents occur to the vehicle, the voltage-regulating capacitor C1 of the HV battery 100 may be discharged. Rapid "active discharging" may be performed through any combination of the first to third discharging paths P1~P3. On the other hand, slow "passive discharging" may be performed through the first discharging path P1. Moreover, in addition to serving as the second discharging path P2, the aux LV power unit 400 may also serve to provide the aux LV level "VL2" to the driver 180 when the LV battery 150 fails. Hence, power supplied to the driver 180 may be ensured, so that parts or all of the switches S31~S36 inside the driver 180 maintain as turned-on. Accordingly, the power control device 2000 and the corresponding power control method of this disclosure may achieve rapid discharging to meet safety requirements for electrical vehicles, which has a technical effect of protecting the power system 1000.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A power control device for controlling a plurality of power supplies of a power system, the power supplies at least include a high-voltage (HV) battery to provide a high-voltage (HV) level, the power control device comprising:

a bleeder circuit, connected with a voltage-regulating capacitor in parallel, the voltage-regulating capacitor is configured to stably maintain the HV level, and the bleeder circuit forms a first discharging path; and an auxiliary low-voltage (aux LV) power supply unit, connected with the bleeder circuit and the voltage-regulating capacitor in parallel, and the aux LV power supply unit forms a second discharging path;

wherein, the power system further includes a motor and a driver, the driver is configured to drive the motor, the driver and the motor form a third discharging path, and the aux LV power supply unit is configured to provide an auxiliary low-voltage (aux LV) level to the driver, when the power system operates abnormally, the HV level maintained by the voltage-regulating capacitor is discharged through the first, second and/or third discharging paths, wherein the bleeder circuit comprises:
a low-resistance resistor, being a surface mount technology (SMT) resistor; and
a first switch, being a relay switch;
wherein the low-resistance resistor is connected with the first switch in series to form the first discharging path, and wherein the aux LV power supply unit comprises:
a transformer, having a first-side coil and a second-side coil;
wherein the first-side coil receives the HV level and the second-side coil generates the aux LV level, the aux LV level is lower than the HV level.

2. The power control device according to claim 1, wherein the aux LV power supply unit further comprises:
a second switch; and
a surge suppression circuit, connected with the first-side coil of the transformer in parallel, the surge suppression circuit comprising:
a first capacitor, a first resistor and a first diode, the first capacitor is connected with the first resistor in parallel, the first capacitor and the first resistor are connected to the first diode in common;
wherein the surge suppression circuit is connected with the second switch in series to form the second discharging path.

3. The power control device according to claim 2, wherein the driver comprises:
a plurality of third switches;
wherein the motor is connected with the third switches to form the third discharging path.

4. The power control device according to claim 3, further comprising:
at least one controller;
wherein, when performing an active discharging function, the at least one controller enables the first switch, the second switch and/or the third switches to turn on the first discharging path, the second discharging path and/or the third discharging path so as to rapidly discharge the HV level maintained by the voltage-regulating capacitor.

5. The power control device according to claim 4, further comprising:
at least one power switch, connected with an anode of the HV battery;
wherein the at least one controller disables the at least one power switch when the power system operates abnormally.

6. The power control device according to claim 3, wherein the power supplies of the power system further comprises:
a low-voltage (LV) battery, for providing a low-voltage (LV) level to the driver;
wherein, when the LV battery operates abnormally, the aux LV power supply unit provides the aux LV level to replace the LV level.

7. The power control device according to claim 6, wherein a cathode of the LV battery is connected to the second-side coil of the transformer, and an anode of the LV battery is connected with the second-side coil of the transformer through a plurality of diodes.

8. The power control device according to claim 7, further comprising:
at least one controller;
wherein, when performing a passive discharging function, the at least one controller enables the first switch to turn on the first discharging path so as to slowly discharge the LV level provided by the LV battery.

9. A power control method for controlling a plurality of power supplies, a motor and a driver of a power system and controlling a power control device as referred in claim 1, the power supplies at least include a high-voltage (HV) battery providing a high-voltage (HV) level and a low-voltage (LV) battery providing a low-voltage (LV) level, and the power control device includes a bleeder circuit and an auxiliary low-voltage (aux LV) power supply unit, wherein the bleeder circuit forms a first discharging path, the aux LV power supply unit forms a second discharging path, the driver and the motor form a third discharging path, and the power control method comprising:
determining whether the LV battery is activated;
when the LV battery is not activated, activating the aux LV power supply unit to generate an auxiliary low-voltage (aux LV) level;
determining whether the HV battery is activated;
when the HV battery is activated, determining that the power system operates abnormally and generating an error signal, and disabling the at least one power switch connected with an anode of the HV battery; and
confirming that the at least one power switch is in a continuously disabled state until the power system is restarted.

10. The power control method according to claim 9, further comprising:
when the HV battery is activated, determining whether to perform an active discharging function;
when performing the active discharging function, initializing at least one controller for controlling the first discharging path, the second discharging path and/or the third discharging path;
controlling the first discharging path, the second discharging path and/or the third discharging path to a turned-on state by the at least one controller;
performing the active discharging function through the first discharging path, the second discharging path and/or the third discharging path to rapidly discharge the HV level; and
determining whether the HV level is lower than a safety voltage.

11. The power control method according to claim 10, wherein the LV level is provided to the driver, and the power control method further comprising:
when the LV battery is activated, determining whether the LV battery operates abnormally; and
when the LV battery operates abnormally, providing the aux LV level to the driver in place of the LV level.

12. The power control method according to claim 11, further comprising:
when the LV battery is activated, determining whether to perform a passive discharging function;
when performing the passive discharging function, controlling the first discharging path to a turned-on state by the at least one controller; and
performing the passive discharging function through the first discharging path to slowly discharge the LV level.

13. The power control method according to claim 9, further comprising:
determining whether the LV battery is activated;
when the LV battery is activated, controlling the power system to operate in a normal operation mode by the at least one controller;
determining whether the HV battery is activated; and
when the HV battery is activated, controlling the power system to operate in a safety protection mode by the at least one controller.

* * * * *